Dec. 10, 1957  S. G. ELLIS  2,816,234
RADIANT ENERGY DETECTION
Filed Oct. 27, 1954

INVENTOR.
Sidney G. Ellis
BY
Morris ...
ATTORNEY.

United States Patent Office 2,816,234
Patented Dec. 10, 1957

2,816,234

RADIANT ENERGY DETECTION

Sidney G. Ellis, Princeton, N. J., assignor to Radio Corporation of America, a corporation of Delaware Application October 27, 1954, Serial No. 465,040

10 Claims. (Cl. 250—83.3)

This invention relates to radiant energy detection, and more particularly to a novel crystallographic method and apparatus for the detection and analysis of radiant energy. Procedures and apparatus which embody the features of the present invention are especially advantageous in the detection and analysis of radiant energy such as that produced by atomic particles in their excited state. This radiant energy may appear in the form of X-rays, gamma rays, cosmic rays and the like.

X-rays and other forms of radiant energy have become an important tool of modern research. The properties of these extremely short wave rays have made them important in the study of matter. Industrial use of radiant energy has enabled the development of many inspection techniques. X-rays and gamma rays are frequently used to find otherwise concealed faults in structures.

The elemental nature of material may be determined by many well known X-ray diffraction and spectographic procedures. In X-ray spectroscopy the material under test is bombarded with an electron beam. This results in the production of X-rays. The detection and analysis of these X-rays reveals the nature of the material.

For detecting and analyzing radiant energy, the exposure of sensitive photographic emulsions is a well known technique which has been termed radiography when applied to the detection of X-rays and gamma rays. Fluorescent crystals may also be employed. Many well known types of nuclear particle counters such as scintillation counters may be equipped with such fluorescent crystals. Ionization chambers are also in common use for determining the effects of radiant energy. A Geiger-Müller tube is a typical ionization chamber.

The quantity of radiant energy that is available for analysis may be very minute. This is ordinarily the case in inspection procedures in which radiant energy must be transmitted through the material under test.

It is known that radiant energy in the form of extremely high frequency electromagnetic radiation is readily scattered and absorbed by any relatively dense object interposed in the path of the energy. Secondary radiation from an object may also take place. Therefore a particularly desirable feature of any radiant energy detector is high sensitivity. Should it be desirable to detect or analyze any particular radiant energy that is penetrating a given region or that is propagated in a preselected direction, additional equipment has been required. An X-ray detector with high directional sensitivity is desirable. Such a detector is provided according to the present invention.

Briefly, a detector of radiant energy embodying principles of the present invention incorporates a photosensitive single crystal of high perfection. The crystal is positioned so that parallel crystalline planes of its atomic lattice lie at the Bragg angle with respect to the preselected direction in which radiant energy is to be detected. The crystal is, therefore, arranged so that the glancing angle of the desired radiant energy striking it is the Bragg angle. The Bragg angle is generally known as the glancing angle of incidence at which reflection of incident, very short wavelength radiant energy from the surface of a crystal occurs, and is defined by the relationship:

$$n\lambda = 2d \sin \theta$$

in which $n$ is an integer $d$ is the distance between adjacent crystal planes or layers, $\lambda$ is the wavelength of the radiant energy and $\theta$ is the Bragg angle.

It has been found that a greater amount of incident radiant energy is absorbed by a crystal when the glancing angle of incidence is the Bragg angle. The absorption of radiant energy arriving at the crystal from other directions is correspondingly less. A theoretical understanding of this effect may be obtained from the fact that reflection of very short wavelength radiant energy occurs by a process of diffraction. The path of radiant energy in the crystal having a glancing angle of incidence on the crystal which is the Bragg angle is, therefore, longer than the path of radiant energy striking the crystal at any other angle. This is especially the case within perfect single crystals such as those which are obtained from the semi-conductor elements, germanium and silicon. The crystal selected is preferably a photosensitive element. Consequently a photoresponsive effect is manifested primarily in response to radiant energy striking the crystal at the Bragg angle. By analyzing this response of the crystal the incident radiant energy in a preselected direction may be analyzed.

Therefore, it is an object of the present invention to provide a novel radiant energy detector.

It is another object of the present invention to provide a novel method for the detection of radiant energy.

It is a further object of the present invention to provide a radiant energy detector having improved sensitivity.

It is a still further object of the present invention to provide a radiant energy detector having high directional sensitivity.

It is a still further object of the present invention to provide a radiant energy detector which is predominantly responsive to radiant energy in a preselected direction and which does not require extensive external equipment.

Other objects and advantages of the present invention will, of course, become apparent and immediately suggest themselves to those skilled in the art to which the invention is directed from a reading of the following specification in connection with the accompanying drawings of which:

Figure 1:
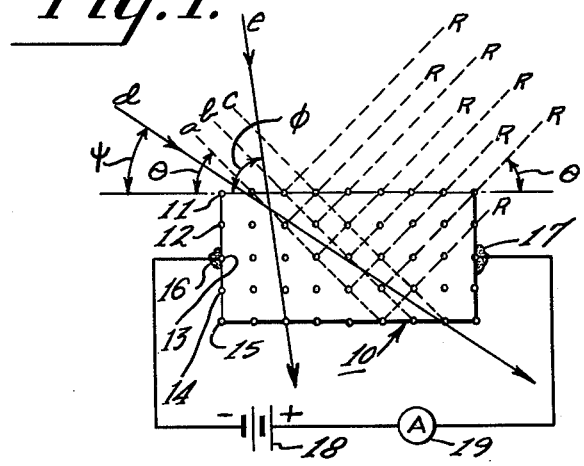
Figure 1 is a partially schematic diagram including an enlarged, simplified plan view of a single crystal for the purpose of illustrating principles of the present invention.

Referring to Figure 1, a cross sectional plan view of a photoconductive single crystal 10 is shown. Layers of atoms which make up the crystal 10 are arranged in parallel planes. Five of these parallel layers 11, 12, 13, 14 and 15 appear in this simplified illustration of the crystal. It will be apparent, of course, that the atomic structure of crystal 10 as shown in Figure 1 is greatly simplified solely for purposes of illustration. However, the illustrative crystal 10 is similar to crystals which are preferred for use in several embodiments of the present invention to the extent that the layers of atoms are parallel over long distances and that the crystal 10 is photoconductive. Conductive contacts 16 and 17 are made with opposite ends of the crystal 10. A battery 18 which is illustrative of any source of non-alternating potential is connected in series with a current indicating device such as an ammeter 19. The battery 18 and ammeter 19 are connected between the contacts 16 and 17. A preferred single crystal of the type illustrated in Figure 1 is composed of a body of semi-conductive material such as germanium or silicon which is prepared in any well known manner to exhibit photoconductive properties.

According to a presently established theory, photons of radiant energy strike the crystal and raise electrons into the conduction band. This is the formation of "hole-electron" pairs. The "holes" may be considered as positive charged carriers and the electrons may be considered as negative charged carriers. If an electrostatic potential is impressed across the photoconductive semi-conductor material, the holes will move toward points of negative potential and electrons will similarly proceed toward points of positive potential. The number of hole-electron pairs depends upon the intensity of the incident radiant energy. The magnitude of the current indicated on the ammeter 19 will vary according to the intensity of the radiant energy striking the crystal 10. If desirable, amplifiers may be used to amplify variations in current magnitude. The ammeter 19 may be calibrated to read radiation intensity in any units appropriate to the type of energy to be detected. To illustrate the manner in which radiant energy is detected, it will be assumed that rays of radiant energy such as X-rays, for example, are incident on the crystal at different angles. Three rays $a$, $b$ and $c$ are parallel and have a glancing angle of incidence on the uppermost surface of the crystal equal to the angle $\theta$. Another ray $e$ strikes the surface of the crystal at a glancing angle of incidence equal to the angle $\phi$. Still another ray $d$ has a glancing angle of incidence upon the crystal which is equal to the angle $\psi$. It may furthermore be assumed that it is desired to detect X-rays arriving at a glancing angle $\theta$ upon the crystal. If $\theta$ is the Bragg angle which may be identified by the above stated formula, the rays $a$, $b$ and $c$ are reflected from the crystal at an equal angle $\theta$. These reflected rays are designated as $R_b$. All the reflected rays, $R_b$, are parallel. It may be observed that a great many more rays are reflected from the surface of the crystal 10 than are incident upon it. This is because the reflection of very short wavelength radiant energy, such as X-rays, from a crystal is by means of diffraction. Each ray striking the crystal at a glancing angle equal to the Bragg angle $\theta$ is subject to multiple internal reflections. As these rays interact with the crystal lattice, they undergo multiple reflections. The reflected rays interact with each other and are eventually reflected from the crystal at an angle which is equal to $\theta$, the Bragg angle. The phenomena of reflection is best analyzed by considering the wave nature of radiation. A discussion of the phenomena relating to X-rays may be found in a text on the subject such as "X-Rays in Practice," by W. T. Sproull, published by McGraw-Hill, see pages 322 to 324. However, it may be observed from the drawing of Figure 1 that a reflected ray may have collided with a plurality of atoms; that is, many more atoms than a ray that was not reflected. As was mentioned above, this collision occurs with a transfer of energy from the incident radiant energy to the crystal lattice. A consequent generation of hole-electron pairs in the crystal lattice takes place. The holes and electrons move toward opposite portions of the crystal which are maintained at opposite polarities. This causes a net current flow which is indicated on the ammeter 19. It may be observed that the Bragg angle $\theta$ depends upon the order of reflection $n$. It is preferable to use the first order of reflection where $n$ is equal to the integer one, since a greater number of multiple, internal reflections in the crystal will occur at first order reflection.

The other rays $d$ and $e$, which may have the same very short wavelength as the other rays $a$, $b$ and $c$, are shown to pass through the crystal. These rays $d$ and $e$, therefore, are not subject to numerous multiple reflections among the atoms in the crystal. Consequently the excitation of the crystal lattice produced by these rays which releases hole-electron pairs is not as pronounced. As a result, the sensitivity of the crystal as a detector of radiant energy arriving at a glancing angle equal to the Bragg angle $\theta$ is much greater than sensitivity to radiant energy arriving at another angle such as $\psi$ or $\phi$.

Although it is known that radiant energy falling upon a crystal at any angle is subject to scattering and absorption in the crystal, the absorption of the energy in rays striking the crystal at angles other than the Bragg angle is less than absorption of energy from rays incident upon the crystal at the Bragg angle. This is because of the far more numerous internal reflections that occur when radiation is incident on the crystal at the Bragg angle.

Since the absorption of energy from rays of radiant energy striking the crystal at the Bragg angle is greater than the absorption of radiant energy from waves striking the crystal at other than the Bragg angle, it is possible to enhance the sensitivity of the crystal to waves that are incident upon it at the Bragg angle by cutting the crystal with a predetermined thickness. According to Lambert's law, the linear absorption coefficient $\mu_1$ expresses the fraction of the radiant energy absorption in each centimeter of depth or thickness of material. Lambert's law may be stated as, $$I = I_0 \epsilon^{-\mu_1 x}$$

where $I_0$ is the intensity of the incident radiant energy; $I$ is the intensity of the radiant energy that passes through the absorbing material, in this case the crystal; $\epsilon$ is the base of natural logarithms; and $x$ is equal to the thickness of the crystal.

Inspection of the mathematical expression of Lambert's law reveals that linear penetration through the crystal for a distance equal to the reciprocal of the usual absorption coefficient $$\frac{1}{\mu_1}$$

results in the absorption of approximately two thirds of the incident radiant energy. It has been established that absorption of the radiant energy that is incident on the crystal at the Bragg angle is more rapid than the absorption of radiant energy arriving at the crystal from any other direction. Consequently, nearly complete absorption of the incident radiation at the Bragg angle occurs over a penetration distance that is equal to less than the reciprocal of the usual absorption coefficient $$\frac{1}{\mu_1}$$

A maximum sensitivity of the detector crystal to incoming radiation at the Bragg angle and a minimum sensitivity with respect to incoming radiation from any other direction is, therefore, obtained by making the thickness of the crystal less than the reciprocal of the usual absorption coefficient of the crystalline material.

Figure 2:
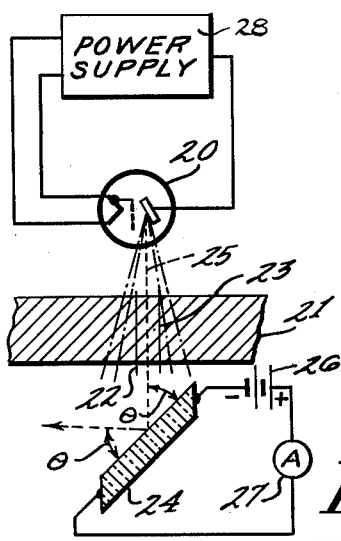
Figure 2 is a diagram which is partially schematic and partially pictorial illustrating an embodiment of the present invention.

In Figure 2 the principles of the present invention are applied in connection with the detection of X-rays. An X-ray tube 20 is connected to its associated power supply 28. The tube provides X-rays which penetrate a sample of material 21 which is shown in section. It is desired to inspect only a portion of the material 21 under test. For example, in the portion lying between the vertical lines 22 and 23, X-rays are shown as dot-dash lines and strike the material under test at various angles. However, in order to inspect the selected portion of the material it is necessary to detect the X-rays passing through that portion to the exclusion of other X-rays. The direction of these X-rays are shown by the dotted line 25 which extends from the anode of the X-ray tube through the material under test. A photoconductive crystal 24 is arranged to detect X-rays in this preselected direction as shown by the dotted line 25. The crystal may be a body of germanium or silicon having substantially parallel layers of atoms. Conductive contact is made to opposite ends of the crystal 24 and a source of potential such as a battery 26 is connected in series with a current indicator 27. The battery 26 and the current indicator 27 are connected across the crystal 24 at the contacts. The current indicator 27 may be an ammeter. The crystal is disposed so that the glancing angle of the X-rays arriving at the crystal from the preselected direction is the Bragg angle, $\theta$. These rays will be reflected at an equal angle $\theta$. The diffraction phenomena discussed in connection with Figure 1 takes place within the crystal lattice. Therefore, hole-electron pairs are created in a quantity that varies according to the intensity of the incident X-rays. X-rays, such as those indicated by dot-dash lines, are incident upon the crystal at other angles than the Bragg angle. However, these X-rays do not contribute materially to the generation of hole-electron pairs. The crystal detector is predominantly sensitive to radiation in the preselected direction and the intensity of this radiation may be indicated on the current indicator 27. It is preferable to use monochromatic X-rays in the aforementioned embodiment of this invention. Means for obtaining such radiation will be discussed in connection with Figure 3.

Figure 3:
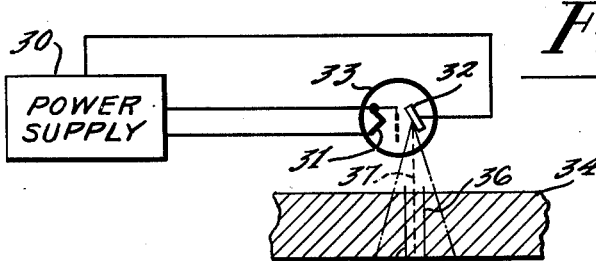
Figure 3 is a diagram in part schematic and in part pictorial of another embodiment of the present invention.

In Figure 3 another embodiment of X-ray detection apparatus according to the present invention as shown. A power supply 30 is connected to the cathode 31 and anode 32 of an X-ray tube 33. This power supply normally establishes a high potential between the cathode 31 and anode 32 of the X-ray tube 33. Operating in a well known manner, the tube 33 produces X-rays at the anode of the X-ray tube which are directed through the tube envelope. An object 34 under test which may be a structure or part of a machine is exposed to the X-rays. Several X-rays are shown emanating from the anode by means of the dot-dash lines. Continuous inspection is possible by moving the objects under test through the X-rays. This may be accomplished manually or by placing the objects on a supporting, moving track. It is desirable, therefore, to inspect a small area of the object 34 at a time. For example, for the object 34 shown in the figure, the area within the vertical lines 35 and 36 is to be inspected. Accordingly, X-rays passing through this area alone should be detected to the exclusion of X-rays which have penetrated any other part of the object 34. This may be accomplished according to the present invention by placing a single crystal 38 in the path of X-rays that pass through the preselected area of the article. The crystal is preferably of high perfection as characterized by parallel layers of atoms. Such X-rays are shown by a dotted line 37 in Figure 3. The crystal is oriented with respect to the path of X-rays through the defined area of the object under test to have a glancing angle of incidence upon the crystal which is equal to the Bragg angle. In the figure, the dotted line 37 illustrates the path of those X-rays which are to be detected. The glancing angle of these X-rays on the crystal is made equal to the Bragg angle, $\theta$. These rays are, therefore, reflected from the crystal at an equal angle, $\theta$. It is preferable and most efficient to utilize the first order Bragg angle.

In this embodiment of the present invention the single crystal is of the fluorescent type. It is preferable that this crystal be of highest perfection. X-ray photons striking the crystal impart energy thereto which is converted into light. A photomultiplier tube 39 is placed adjacent to the crystal 38 and converts the light generated therein into electrical signals. The electrical signals may be amplified by an amplifier 40 and recorded upon a recording instrument 41 which may be an oscillograph, voltmeter, counter, or the like. The detection of light signals by means of a system comprising a photomultiplier, an amplifier and a recorder are known and do not require a further detailed description.

It has been mentioned that the Bragg angle, $\theta$, is a function of wavelength. The angle $\theta$ will, therefore, be different for different wavelengths. It is preferable, therefore, to utilize a source of radiant energy that has strong components of a fixed wavelength together with the photosensitive crystal detector elements of the present invention. Techniques for obtaining radiation of a particular wavelength are well known. X-rays of the same wavelength are characterized by the term monochromatic. Monochromatic X-rays are obtainable by the use of filters which absorb the undesired wavelengths and transmit only the desired monochromatic radiation. Another method is to place an additional crystal (not shown) inclined at the Bragg angle with respect to radiation at the desired wavelength. Calcite crystals are ordinarily used in this method. The reflected radiation from the crystal at the Bragg angle will consequently be monochromatic. The efficiency of these monochromatizing processes is very low. They produce a monochromatic beam of X-rays with greatly reduced intensity. For the majority of industrial applications an intense beam of X-rays is desirable. It is known, however, that the bombardment of different materials by high velocity electrons produces X-rays that are most intense at particular or characteristic wavelengths. These X-rays are known as the characteristic radiation from the material. Therefore, X-rays produced by an X-ray tube may be used directly. The wavelength tube used in determining the Bragg angle at which to orient the crystal is the wavelength of the characteristic radiation from the material of which the anode of the X-ray tube is constructed.

Figure 4:
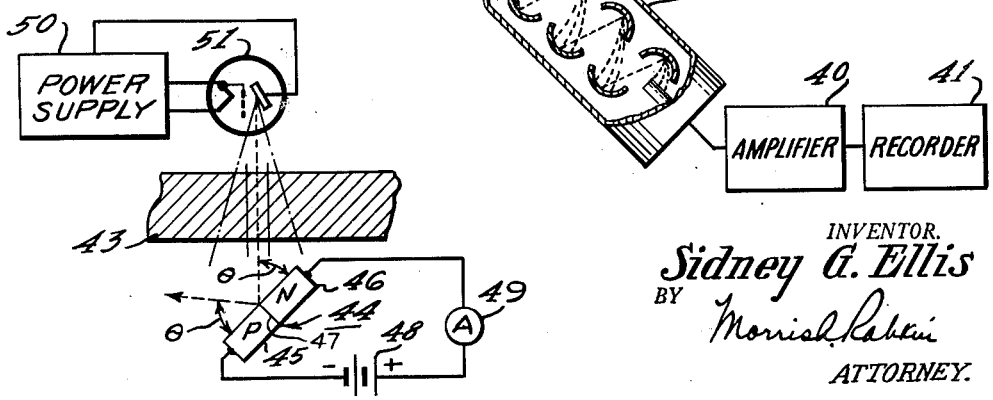
Figure 4 is a partially pictorial and partially schematic diagram of still another embodiment of the present invention.

Referring to Figure 4, another crystallographic X-ray detector is provided according to a further embodiment of the radiant energy detection apparatus of the present invention. A power supply 50 is connected to an X-ray tube 51 which directs a beam of X-rays upon an object 43 under test. This X-ray tube 42 and object 43 under test is similar to those in Figures 2 and 3. A crystal 44 is oriented at the Bragg angle, $\theta$, with respect to a preselected direction of radiation through the object 43 under test. The crystal 44 is of the photoconductive type. Conductive contact is made to opposite ends of the crystal 44. The crystal in this embodiment of the present invention, however, is unique. It is composed of a body of semi-conductive material having a zone therein of one conductive type, contiguous with at least one other zone of the opposite conductivity type. The crystal may, therefore, comprise a P conductivity type zone 45 and a N conductivity type zone 46. A P-N junction 47 is, therefore, found in the crystal 44. The photodetective properties of a P-N junction crystal are more effective than those of known photoconductive single crystals. The crystal 44 may be composed of such semi-conductor materials such as germanium or silicon. In order to obtain a maximum sensitivity of the crystal to incident radiation, it is preferable to orient the crystal 44 so that the radiation is directly incident upon the crystal 44 in the neighborhood of the P-N junction 47. As mentioned previously, the glancing angle of incidence of the desired radiation upon the crystal is the Bragg angle, $\theta$.

X-ray photons, or other forms of radiant energy which arrive in the neighborhood of the junction, excite the atomic structure of the crystal and release hole-electron pairs on at least one side of the junction. Normal conduction through the crystal is by means of holes in the P region and electrons in the N region. There is a path of low resistance through the crystal for current flowing from the P region into the N region. However, there is a high back resistance for current flowing through the crystal in the reverse direction, from the N region to the P region. The means for reverse conduction is by means of excess holes in the N region which diffuse into the P region through the junction, and by means of excess electrons in the P region which diffuse through the junction into the N region. According to a preferred embodiment of the present invention, the negative terminal of a battery 48 or other source of direct current potential is connected to the P region 45 of the crystal 44. Positive potential is applied to the N region 46. This effectively lowers the potential barrier to reverse current flow through the junction 47. This reverse or back-current flow may be indicated on the current indicator such as an ammeter 49. Normally there is only a minute quantity of excess electrons in the P region and excess holes in the N region. Therefore, this back-current through the ammeter is normally insignificant. However, the incident X-rays cause the production of excess hole-electron pairs. This provides additional excess electrons in the P region and additional excess holes in the N region. The back-current is, therefore, effectively increased in proportion to the intensity of the X-rays. The sensitivity of this embodiment of X-ray detection apparatus, according to the present invention, is greatly enhanced because of the inherent sensitivity of the P-N junction to radiation which is incident upon it, and especially to radiation arriving at the Bragg angle.

For purposes of illustration, the accompanying detailed description of this invention is partially concerned with the detection and analysis of X-rays. However, it will be understood that the features of this invention may be readily adapted to the detection of other similar forms of radiant energy.

What is claimed is:

1. A method for the detection of radiant energy comprising orienting a photosensitive crystal so that the glancing angle of said radiant energy on said crystal is the Bragg angle, and recording a change in a physical characteristic of said crystal in response to said radiant energy.

2. A method for the detection and analysis of X-rays along a preselected path comprising the steps of disposing a semiconductive single crystal of the photosensitive type so that parallel crystalline planes thereof lie at the Bragg angle with respect to said preselected path whereby said crystal is primarily responsive to X-rays that are directed along said preselected path, and deriving a measurement of direct current flow through said crystal in accordance with said response from said crystal.

3. A method of X-ray detection and analysis comprising producing a substantially monochromatic beam of X-rays, directing said X-rays upon a sample of material under study, disposing a photosensitive single crystal so that parallel planes of atoms in the atomic lattice thereof are oriented at the Bragg angle with respect to a predetermined path of X-rays incoming upon said crystal from said sample, and recording the response of said crystal to said X-rays.

4. A radiant energy detector for detecting radiant energy in a preselected direction comprising a photosensitive single crystal, means for orienting said crystal at the Bragg angle with respect to said preselected direction of incoming radiant energy, and means for recording a change in a physical characteristic of said crystal in response to said incoming radiant energy.

5. Apparatus for the detection and analysis of radiant energy comprising means for providing a beam of radiant energy, a photosensitive single crystal, means for disposing said crystal with respect to said beam of radiant energy whereby said crystal is responsive primarily to said radiant energy incident thereon at a glancing angle of incidence whereat reflection takes place from said crystal, and means for recording a change in a physical characteristic of said crystal in response to said radiant energy.

6. Apparatus for the detection and analysis of radiant energy in a path described along a preselected direction comprising a photoconductive single crystal comprising a body of semiconductive material having therein a zone of one conductivity type contiguous with a zone of the opposite conductivity type defining a semi-conductor junction therein, means for disposing said junction in said path of said radiant energy and orienting said crystal at the Bragg angle with respect to said preselected direction, means for impressing biasing potential across said crystal, and means for measuring current through said crystal.

7. Apparatus for detecting and analyzing X-rays comprising means providing substantially monochromatic X-rays, means for directing said X-rays upon an object under study, a photoconductive single crystal, means for disposing said photoconductive single crystal at the Bragg angle with respect to X-rays emanating in a preselected direction from said object, and means for detecting the change in conductivity of said crystal.

8. Apparatus according to claim 7 wherein said photoconductive crystal is composed of germanium.

9. Apparatus according to claim 7 wherein said photoconductive crystal is composed of silicon.

10. Apparatus for the detection and analysis of radiant energy in the form of X-rays comprising means for providing a beam of said radiant energy, a photosensitive single crystal of semiconductive material comprising a P conductivity type zone contiguous with an N conductivity type zone, means for disposing said single crystal at the Bragg angle with respect to a path described by said radiant energy emanating from said object in a preselected direction, means whereby a junction of said two contiguous zones is disposed in said path described by said radiant energy, means connected across said crystal to bias said crystal in a direction to aid current flow from said N zone to said P zone, and means to indicate current flow through said crystal.

References Cited in the file of this patent

UNITED STATES PATENTS

| | | |
|---|---|---|
| 2,428,796 | Friedman | Oct. 14, 1947 |
| 2,452,045 | Friedman | Oct. 26, 1948 |
| 2,694,112 | McKay | Nov. 9, 1954 |
| 2,706,792 | Jacobs | Apr. 19, 1955 |